United States Patent [19]

Andre

[11] Patent Number: 4,587,405
[45] Date of Patent: May 6, 1986

[54] DEVICE TO CONTROL THE COOKING PROCESS IN A STEAM PRESSURE COOKER

[75] Inventor: Wolfram K. Andre, Aichwald, Fed. Rep. of Germany

[73] Assignee: Kurt Wolf & Co. KG, Fed. Rep. of Germany

[21] Appl. No.: 602,811

[22] Filed: Apr. 23, 1984

[30] Foreign Application Priority Data

May 7, 1983 [DE] Fed. Rep. of Germany ....... 3316799

[51] Int. Cl.$^4$ ............................................. H05B 1/02
[52] U.S. Cl. .................................... 219/491; 219/492; 219/497; 219/419; 340/589; 99/328; 99/333; 426/520
[58] Field of Search ............... 219/491, 497, 489, 501, 219/492, 493, 507–509, 419; 99/328, 333, 329, 332; 426/243, 523, 520; 340/588, 589

[56] References Cited

U.S. PATENT DOCUMENTS

| | | | |
|---|---|---|---|
| 2,472,451 | 6/1949 | Whitney | 99/333 |
| 3,302,001 | 1/1967 | Frazier | 99/333 |
| 4,077,690 | 3/1978 | Koether | 99/328 |
| 4,097,707 | 6/1978 | Kobayashi et al. | 219/10.55 B |
| 4,162,381 | 7/1979 | Buck | 219/10.55 B |
| 4,304,177 | 12/1981 | Loeffler et al. | 99/333 |
| 4,379,964 | 4/1983 | Kanazawa et al. | 219/497 |

Primary Examiner—M. H. Paschall
Attorney, Agent, or Firm—Thomas W. Speckman

[57] ABSTRACT

A device for the control of the cooking process in a steam pressure cooker filled with water and the food to be cooked and heatable by means of a heating element controlled by a control circuit wherein the temperature of the pressure cooker is detected and utilized by way of the control circuit for the adjustment of the heat output of the heating element and in which by means of an adjustable timing element a cooking time can be preselected. The cooking time in the pressure cooker is maintained regardless of the inertia of the cooking system by the fact that a timing element begins measurement of the preselected cooking time only upon reaching a preset measuring temperature between the vapor phase temperature and the evaporation temperature of the water and, dependent upon the length of time that elapses between the reaching of the vapor phase temperature and the reaching of the vaporation temperature of the water in the pressure cooker, is so controllable that it causes disconnection of the heating element before the end of the preselected cooking time in proportion to the measured length of time between reaching the vapor phase temperature and the evaporation temperature of the water.

10 Claims, 4 Drawing Figures

DEVICE TO CONTROL THE COOKING PROCESS IN A STEAM PRESSURE COOKER

BACKGROUND OF THE INVENTION

1. Field of the Invention

A device to control the cooking process in a steam pressure cooker filled with water and food to be cooked, heated by means of a heating element controlled by a control circuit, wherein the temperature in or on the pressure cooker is detected and utilized by the control circuit to adjust the heat output of the heating element and in which a cooking time can be preselected by means of an adjustable timing element.

2. Description of the Prior Art

Devices of this kind are known in which the timing element is separate, electrically and mechanically, from the control circuit of the heating element and is manually adjustable. After termination of the preselected cooking time, an optical and/or acoustical signal is given by the timing element to indicate the end of the cooking time.

In these known devices the cooking time is preset to a fixed time period, which disregards the time constant of the total cooking system. Depending upon the size of the cooking vessel, the heat output of the heating element, and the amount of food contained in the cooking vessel, the cooking system has differing heating and cooling phases that are expressed by differing temperature-time characteristic lines. It is these different time constants of the cooking system that are not considered in the known devices. The preset cooking time according to the timing element can, however, be so influenced by the above properties of the cooking system that the actual cooking time is too short or too long. In the heating phase, the measurement of the cooking time, according to the control circuit, starts before the cooking temperature is reached. This leads to a shortening of the actual cooking time. In the cooling phase which occurs after the heating element is switched off, the cooking system remains at the cooking temperature for some time, so that the cooking time is extended. It has been found that this characteristic of the cooking system in the cooling phase bears a particular relationship to the characteristic of the heating phase.

SUMMARY OF THE INVENTION

It is one objective of the present invention in a device of the type mentioned above to automatically adjust the cooking time preset by the timing element to take into consideration different temperature-time characteristic lines of the variable cooking system, so that the preselected cooking time is actually maintained in the pressure cooker, in the presence of differing temperature-time characteristics.

This objective is attained according to the invention as follows: the timing element begins to measure the preset cooking time only when a preselected temperature is reached between the evaporation temperature of water and the actual cooking temperature, and, depending on the length of time between reaching of the vapor phase temperature and reaching the evaporation temperature of the water in the pressure cooker, is controllable so that it shuts off the heating element before the end of the preset cooking time, and the earlier the evaporation temperature is reached, the shorter the length of time before the end of the preset cooking time.

Advantage is taken of the knowledge that the length of time which elapses between reaching the vapor phase temperature and the evaporation temperature of the water in the pressure cooker is a measurement of the inertia of the cooking system for the quantity of food in the pressure cooker. Since the measurement of the cooking time does not begin until the preselected temperature which is above the evaporation temperature of water, is reached, the influence of the heating phase is eliminated.

On the basis of the detected length of heating time it is possible ot predict the length of the cooling phase, and to adjust the timing element to advance the shut-off of the heating element in each case, taking into consideration the cooling-off phase, so that the preset cooking time is actually maintained in the steam pressure cooker. Since the length of time between reaching the vapor phase temperature and the evaporation temperature of the water in the pressure cooker is directly related to the length of the cooling phase, after the time period is detected, the preset cooking time can be changed on the basis of a predetermined relationship. This relationship between the detected time period and the shortened cooking time interval is such that shutting off the heating is accelerated so that at the end of the shortened time, the cooling takes place right up to the preselected measuring temperature.

It has been found that a sufficiently accurate automatic adjustment of the cooking time is possible by reducing the preselected cooking time by a time interval that increases linearly with the detected length of time taken to heat.

In one embodiment, the temperature in or on the pressure cooker is monitored by a temperature sensor with a signal transmitter, the signal transmitter transmits via a transmission device the signals representing the detected temperature to a signal receiver, and the receiver emits control signals that are proportional to the temperature in or on the pressure cooker.

The temperature-time characteristic line for measuring the preselected cooking time is monitored in one embodiment so that the control signals of the signal receiver are monitored for the appearance of a value representing the preselected measurement temperature and the timing element can be set to begin the preset cooking time measurement upon reaching the preselected measurement temperature.

Automatic adjustment of the preset cooking time to the temperature-time characteristic line takes place as follows in one embodiment: a time-measuring device is triggered upon the appearance of control signals from the signal receiver indicating the reaching of the vapor phase temperature and the reaching of the evaporation temperature of the water and detects the length of time between these two control signals; the time measuring device transmits to the timing device a signal representing the detected length of time and shortens the preset cooking time correspondingly.

In one embodiment the premature shutting off of the heating element is handled preferably by having the timing element block or turn off the control circuit of the heating element after the completion of the shortened cooking time, or by having the timing element, after the completion of the shortened cooking time, cause a switching device to respond, interrupting the control circuit or the power supply circuit of the control circuit with its rest contact.

BRIEF DESCRIPTION OF THE DRAWINGS

The invention will be explained in greater detail with the aid of the drawings wherein.

DESCRIPTION OF THE PREFERRED EMBODIMENTS

Figure 1:
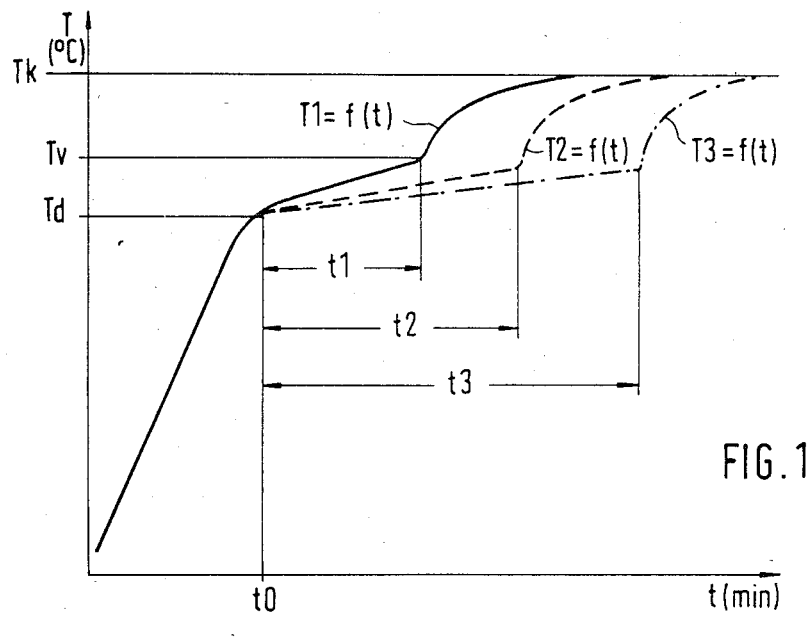
FIG. 1 shows different temperature-time characteristic lines representing the heating phase of a steam pressure cooker with different quantities of cooking material.

As shown in FIG. 1, the temperature-time characteristic lines $T1=f(t)$, $T2=f(t)$ and $T3=f(t)$ represent the heating phase of a cooking system, with an equal amount of water in the pressure cooker for steam formation. The amount of cooking material, however, is different and is indicated in equivalent water quantities. The temperature-time characteristic lines show that the temperature increase to the vapor phase temperature Td, which begins at $Td=90°$ C., is independent of the amount of food being cooked. When the vapor phase temperature, Td, is reached, it takes different lengths of time to reach the evaporation temperature of the water in the pressure cooker $Tv=100°$ C., as indicated by time length t1, t2 and t3, respectively. When the evaporation temperature of the water Tv is reached, then the temperature increase to the cooking temperature Tk is again essentially independent of the quantity of food being cooked. The time constant of the cooking system is therefore most clearly expressed in the detected length of time between Td, the vapor phase temperature and the evaporation temperature of the water Tv, which increases with increasing quantity of food.

Figure 2:
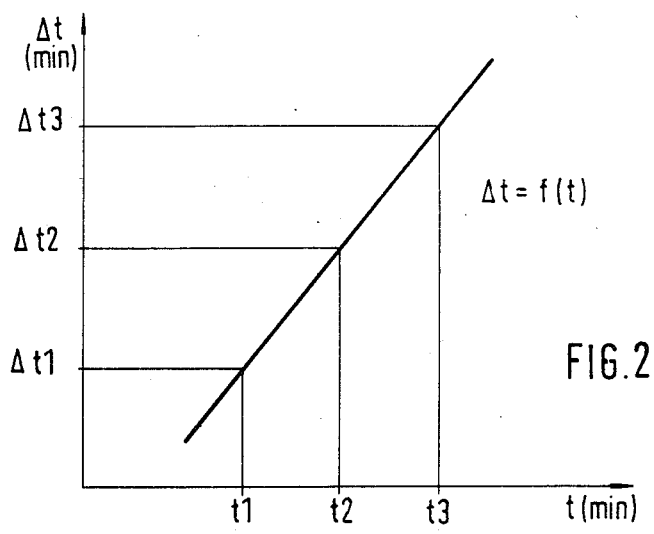
FIG. 2 shows a diagram that demonstrates the relationship between the time that elapses between the reaching of the vapor phase temperature and the evaporation temperature of water in the pressure cooker.

As shown in FIG. 2, the time lengths t1, t2, t3 are a direct measurement of the shortening period Δt to be executed and, as can be seen from the characteristic line $\Delta t=f(t)$, a linear relationship exists. If time t is doubled, then the shortening period Δt is correspondingly about twice as great. This relationship can be utilized to automatically adjust the preselected cooking time, as will be shown.

Figure 3:
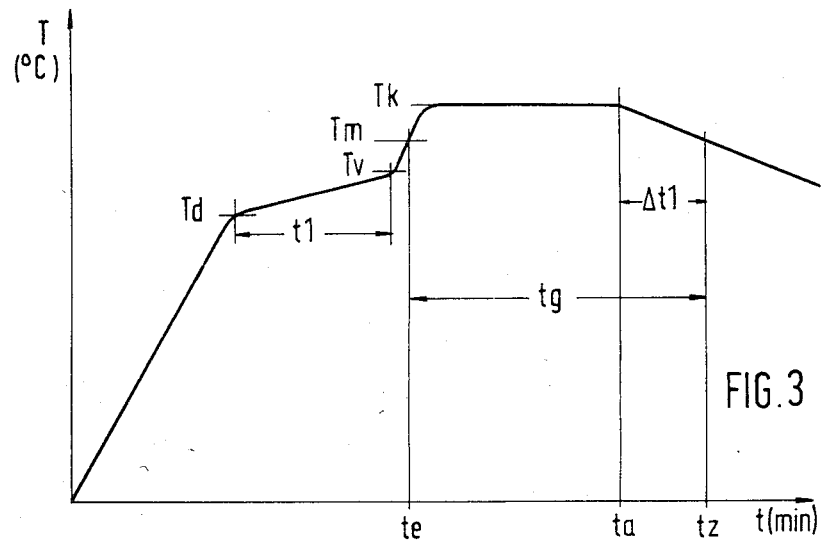
FIG. 3 shows a temperature-time characteristic line for a cooking process with a device according to the invention.

FIG. 3 shows a temperature-time characteristic line for a cooking process. The heating phase is terminated upon reaching the cooking temperature Tk. In the heating phase time t1, which elapses between the reaching of the vapor phase temperature $Td=90°$ C. and the evaporation temperature of the water $Tv=100°$ C., is detected. Thereby a measurement for the inertia of the cooking system for the quantity of cooking material in the pressure cooker is derived. From the time t1, the cooling phase may be predicted. If the heating element is shut off at time ta, then over the interval Δt1, from time ta to time tz the decrease in the cooking temperature Tk in the pressure cooker to the preselected temperature Tm will be linear. The actual cooking time tg extends therefore from the time tz. If the cooking time tg is preset in the timing device, then when time t1 of the heating phase is determined, the preset time can be shortened by period Δt1 and shut-off time ta for the heating element is correspondingly advanced by this interval. The greater the detected time length t1, t2 or t3 in the heating phase, the greater the shortening period Δt1, Δt2 or Δt3. Thus, regardless of the inertia of the cooking system, i.e., of the amount of cooking material in the pressure cooker, the preselected cooking time tg set by the timing device can be so adjusted that the preselected measurement temperature Tm in the pressure cooker can be maintained even beyond this set time.

Figure 4:
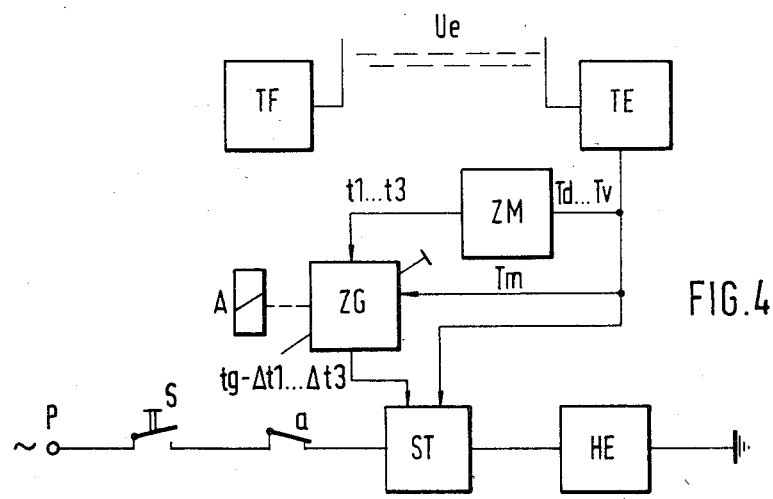
FIG. 4 shows a schematic block diagram for a device according to this invention to automatically adapt a preselected cooking time to different temperature-time characteristic lines.

FIG. 4 shows a block diagram of a device that automatically adjusts the preselected cooking time tg. With switch S the power supply for control circuit ST and heating element HE is connected to phase P of the electric current supply. Heating element HE heats up the pressure cooker. In or on the pressure cooker there is temperature sensor, TF, with a signal transmitter which detects the temperature. The signal transmitter transmits the signal through transmitting device Ue to signal receiver TE, which indicates the temperature present in the pressure cooker. Signal receiver TE emits a control signal that corresponds to the temperature-time characteristic line $T1=f(t)$, $T2=f(t)$ or $T3=f(t)$, respectively. The control signal is fed directly to control circuit ST which controls heating element HE in a known manner so that the preselected cooking temperature Tk is maintained.

Desired cooking time tg is preset with adjustable timing element ZG. Signal receiver TE controls, with its control signal, time measuring device ZM, which, when a control signal corresponds to the vapor phase temperature Td, begins to measure the time length and, when a control signal corresponds to the evaporation temperature of water Tv, feeds to timing element ZG a signal corresponding to time length t1, t2 or t3, respectively. Timing element ZG is triggered by the control signal of signal receiver TE when the latter indicates the preselected measuring temperature Tm is reached. The timing element then begins to measure the preselected cooking time tg. The signal emitted by time-measuring device ZM that indicates the detected time length t1, t2 or t3 shortens the preset time in timing element ZG by shortening interval Δt1, Δt2 or Δt3, so that the time to be measured is actually tg-Δt1, tg-Δt2 or tg-Δ3. When the shortened cooking time has expired, timing element ZG disconnects control circuit ST directly, or switching means A can be made to interrupt the control circuit or the power supply circuit of control circuit ST with contact a. The disconnection time ta in the cooking process is thereby automatically selected so that the cooking phase is taken into account so that over preselected cooking time tg, the preset measuring temperature Tm is actually maintained in the pressure cooker independently of the quantity of cooking material in the pressure cooker.

I claim:

1. A device to regulate the cooking process in a steam pressure cooker enclosing water and food to be cooked and heated by a heating element controlled by a control means comprising a temperature sensor means (TF) measuring the temperature of said pressure cooker and transmitting a signal to signal means (TE), said signal means (TE) transmitting a control signal corresponding to the temperature measured to a time measuring means (ZM), a timer means (ZG) and a control circuit means (ST) controlling heating element (HE); said time measuring means (ZM) activating when it receives a control signal corresponding to the vapor phase temperature (Td) of said water and deactivating when it receives a control signal corresponding to the evaporation temperature (Tv) of said water to measure the time interval (t1) elapsing between reaching said vapor phase temperature (Td) and said evaporation temperature (Tv), and said time measuring means (ZM) transmitting a signal corresponding to said time interval (t1) to said timer means (ZG); said timer means (ZG) preset to measure a preselected cooking time (tg) activating when it receives a control signal from signal means (TE) corresponding to a preselected measuring temperature (Tm) between said evaporation temperature (Tv) and a preselected cooking temperature (Tk) to measure said preselected cooking time (tg) shortened by an interval of time (Δt1) proportional to said measured time (t1), and said timer means (ZG) deactivating said control circuit means (ST) for said heating element (HE) when a shortened cooking time (tg-Δt1) has elapsed; said signal means activating and deactivating control circuit means (ST) during said shortened cooking time (tg-Δt1) to maintain said cooking temperature (Tk).

2. A device according to claim 1, wherein said temperature sensor means (TF) is connected to a signal transmitter means, said signal transmitter means transmits signals indicating the measured temperature by way of a transmitting means (Ue) to said signal receiver means (TE) and said signal receiver means (TE) emits control signals that are linearly proportional to said temperature of said pressure cooker.

3. A device according to claim 2, wherein said timer means (ZG) blocks said control circuit means (ST) from a power supply means.

4. A device according to claim 1, wherein said timer means (ZG) activates a switching means to interrupt the power supply circuit of said control circuit means (ST) by opening a contact means (a).

5. A device according to claim 1, wherein said timer means (ZG) blocks said control circuit means (ST) from a power supply means.

6. A device according to claim 1, wherein said timer means (ZG) activates a switching means to interrupt the power supply circuit of said control circuit means (ST) by opening a contact means (a).

7. In a process for regulation of the cooking process in a steam pressure cooker enclosing water and food to be cooked and heated by a heating element controlled to maintain a cooking temperature (Tk) by a control means wherein the temperature of said pressure cooker is measured and transmitted to said control means, the improvement comprising: measuring the time interval (t1) between the vapor phase temperature (Td) of said water and the evaporation temperature (Tv) of said water; shortening a preselected cooking time (tg) by a shortening time (Δt1) proportional to said time interval (t1), starting said preselected cooking time (tg) at a preselected measurement temperature (Tm) between said evaporation temperature (Tv) and a preselected cooking temperature (Tk), and maintaining said preselected cooking temperature (Tk) for a shortened cooking time (tg-Δt1).

8. In a process according to claim 7 wherein said shortening time (Δt1) increases linearly with said time interval (t1).

9. In a process according to claim 8 wherein control signals corresponding to said temperature of said pressure cooker are monitored for a value representing said preselected measurement temperature (Tm) and upon appearance of said value a timer means (ZG) is triggered for commencement of measuring said shortened cooking time (tg-Δt1).

10. In a process according to claim 7 wherein control signals corresponding to said temperature of said pressure cooker are monitored for a value representing said preselected measurement temperature (Tm) and upon appearance of said value a timer means (ZG) is triggered for commencement of measuring said shortened cooking time (tg-Δt1).

* * * * *